US011923600B2

(12) United States Patent
Asrani et al.

(10) Patent No.: US 11,923,600 B2
(45) Date of Patent: Mar. 5, 2024

(54) MULTI-FUNCTION MODULE FOR MMWAVE COMMUNICATION AND USER INPUT USING MECHANICAL SWITCHES IN AN ELECTRONIC DEVICE

(71) Applicant: Google LLC, Mountain View, CA (US)

(72) Inventors: Vijay L. Asrani, San Jose, CA (US); Warren Z. Jones, Glen Ellyn, IL (US)

(73) Assignee: Google LLC, Mountain View, CA (US)

( * ) Notice: Subject to any disclaimer, the term of this patent is extended or adjusted under 35 U.S.C. 154(b) by 315 days.

(21) Appl. No.: 17/434,290

(22) PCT Filed: Oct. 15, 2020

(86) PCT No.: PCT/US2020/055762
§ 371 (c)(1),
(2) Date: Aug. 26, 2021

(87) PCT Pub. No.: WO2022/081160
PCT Pub. Date: Apr. 21, 2022

(65) Prior Publication Data
US 2022/0311125 A1    Sep. 29, 2022

(51) Int. Cl.
*H01Q 1/24* (2006.01)
*H01Q 1/44* (2006.01)
(Continued)

(52) U.S. Cl.
CPC ............. *H01Q 1/243* (2013.01); *H01Q 1/44* (2013.01); *H01Q 9/0407* (2013.01); *H01Q 21/08* (2013.01); *H04B 1/3827* (2013.01)

(58) Field of Classification Search
CPC ............ H01Q 1/24; H01Q 1/243; H01Q 1/44; H01Q 9/0407; H01Q 21/08
See application file for complete search history.

(56) References Cited

U.S. PATENT DOCUMENTS 9,059,505 B1    6/2015  Asrani et al.
9,548,787 B1 *  1/2017  Lee ......................... H01Q 1/44
(Continued)

FOREIGN PATENT DOCUMENTS

CN    108093105    5/2018
CN    108600448    9/2018
(Continued)

OTHER PUBLICATIONS

"International Preliminary Report on Patentability", Application No. PCT/US2020/055762, dated Apr. 13, 2023, 7 pages.
(Continued)

*Primary Examiner* — Hoang V Nguyen
(74) *Attorney, Agent, or Firm* — Colby Nipper PLLC (57) ABSTRACT

This document describes a multi-function module for mmWave communication and user input using mechanical switches in an electronic device. The multi-function module may be located behind a non-conductive button (e.g., volume button, power button) of the electronic device. Further, the multi-function module includes an elongated antenna substrate with mechanical switches mounted thereon and distributed along a longitudinal length of the antenna substrate. At least one of the mechanical switches is implemented as a radiating element for a mmWave patch antenna. The multi-function module also includes one or more integrated circuit components mounted to the antenna substrate and configured to use the at least one mechanical switch as the radiating element for the mmWave patch antenna to provide the mmWave communication. In this way, the multi-function module enables the mechanical switches to coexist with the mmWave patch antennas.

20 Claims, 8 Drawing Sheets

(51) Int. Cl.
  *H01Q 9/04*      (2006.01)
  *H01Q 21/08*     (2006.01)
  *H04B 1/3827*    (2015.01)

(56) References Cited

U.S. PATENT DOCUMENTS

| | | | |
|---|---|---|---|
| 2008/0074329 | A1 | 3/2008 | Caballero et al. |
| 2009/0251384 | A1 | 10/2009 | Ligtenberg et al. |
| 2020/0153947 | A1 | 5/2020 | Hwang et al. |

FOREIGN PATENT DOCUMENTS

| | | |
|---|---|---|
| TW | 201947815 | 12/2019 |
| WO | 2020036237 | 2/2020 |
| WO | 2020180493 | 9/2020 |

OTHER PUBLICATIONS

"International Search Report and Written Opinion", Application No. PCT/US2020/055762, dated Jun. 29, 2021, 11 pages.

"Foreign Office Action", TW Application No. 110133504, dated Nov. 25, 2022, 13 pages.

\* cited by examiner

MULTI-FUNCTION MODULE FOR MMWAVE COMMUNICATION AND USER INPUT USING MECHANICAL SWITCHES IN AN ELECTRONIC DEVICE

RELATED APPLICATION(S)

This application is a national stage entry of International Application No. PCT/US2020/055762, filed Oct. 15, 2020 the disclosure of which is incorporated herein by reference in its entirety.

BACKGROUND

With continual advances in wireless technology, many electronic devices are designed to wirelessly communicate using millimeter wave (mmWave) frequencies, which are frequencies between 24 gigahertz (GHz) and 300 GHz. Because mmWave signals have short wavelengths, they may be susceptible to interference from objects in their path. Because of this, multiple mmWave modules and non-conductive window coverings are sometimes used to reduce interference.

Aesthetics of small, handheld electronic devices, such as mobile phones, generally demand a metal frame for the device, which results in a higher perceived quality, durability, and resiliency compared to that of a non-metal frame. Including an electrically transparent (e.g., plastic) window over a mmWave module implemented on the side of the device, therefore, may not be desirable from an industrial point of view, e.g., the plastic window may create a discontinuity in the metal frame or trim of the electronic device. Therefore, challenges arise in implementing multiple mmWave modules into electronic devices, particularly handheld electronic devices, while maintaining both high-performance mmWave functionality and high quality in terms of industrial design.

SUMMARY

This document describes a multi-function module for mmWave communication and user input using mechanical switches in an electronic device. The multi-function module may be located behind a non-conductive button (e.g., volume button, power button) of the electronic device. The multi-function module includes an elongated antenna substrate with mechanical switches mounted thereon and distributed along a longitudinal length of the antenna substrate. At least one of the mechanical switches are implemented as a radiating element for a mmWave patch antenna. The multi-function module also includes one or more integrated circuit components mounted to the antenna substrate and configured to use the at least one mechanical switch as the radiating element for the mmWave patch antenna to provide the mmWave communication. The multi-function module enables the mechanical switches to coexist with the mmWave patch antennas.

In one aspect, a, multi-function module for mmWave communication and user input using mechanical switches is disclosed. The multi-function module includes an elongated antenna substrate, a plurality of mechanical switches, and one or more integrated circuit components. The mechanical switches are mounted to the elongated antenna substrate and distributed along a longitudinal length of the elongated antenna substrate. At least one of the mechanical switches is implemented as a radiating element for a mmWave patch antenna. The integrated circuit components are mounted to the elongated antenna substrate and configured to use the at least one mechanical switch as the radiating element for the mmWave patch antenna to provide the mmWave communication.

In other aspects, an electronic device is disclosed. The electronic device includes an enclosure having an exterior wall defining an elongated hole. In addition, the electronic device includes a non-conductive hardware button positioned within the elongated hole in the enclosure. The electronic device also includes the multi-function module described above, where the multi-function module is aligned with the non-conductive hardware button.

This summary is provided to introduce simplified concepts concerning a multi-function module for mmWave communication and user input using mechanical switches in an electronic device, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a multi-function module for mmWave communication and user input using mechanical switches in an electronic device are described in this document with reference to the following drawings. The same numbers are used throughout the drawings to reference like features and components.

DETAILED DESCRIPTION

Overview

Incorporating mmWave functionality into an electronic device while maintaining a high-quality industrial design can be challenging, at least in part because materials used to provide the high-quality industrial design may interfere with mmWave signals, but materials used to reduce the interference to the mmWave signals may also reduce the quality of the industrial design. Accordingly, techniques are described herein to combine mmWave functionality with a pressable button (e.g., a volume button) of an electronic device using mechanical switches. This combination of mmWave functionality and button functionality enables a mmWave module to be implemented on the metal frame of the electronic device without compromising the industrial design or quality of the metal frame.

In an example, a multi-function module for mmWave communication and user input using mechanical switches in an electronic device is described. The multi-function module utilizes mechanical switches mounted on an elongated antenna substrate as radiating elements for a mmWave patch antenna. The mechanical switches may also be used as switches for user input to trigger a function of the electronic device to, for example, increase or decrease the volume. In this way, the mmWave patch antennas are combined with the mechanical switches.

These are but a few examples of how the described techniques and devices may be used to enable a multi-function module for mmWave communication and user input using mechanical switches in an electronic device. Other examples and implementations are described throughout this document. The document now turns to an example system.

Example System

Figure 1:
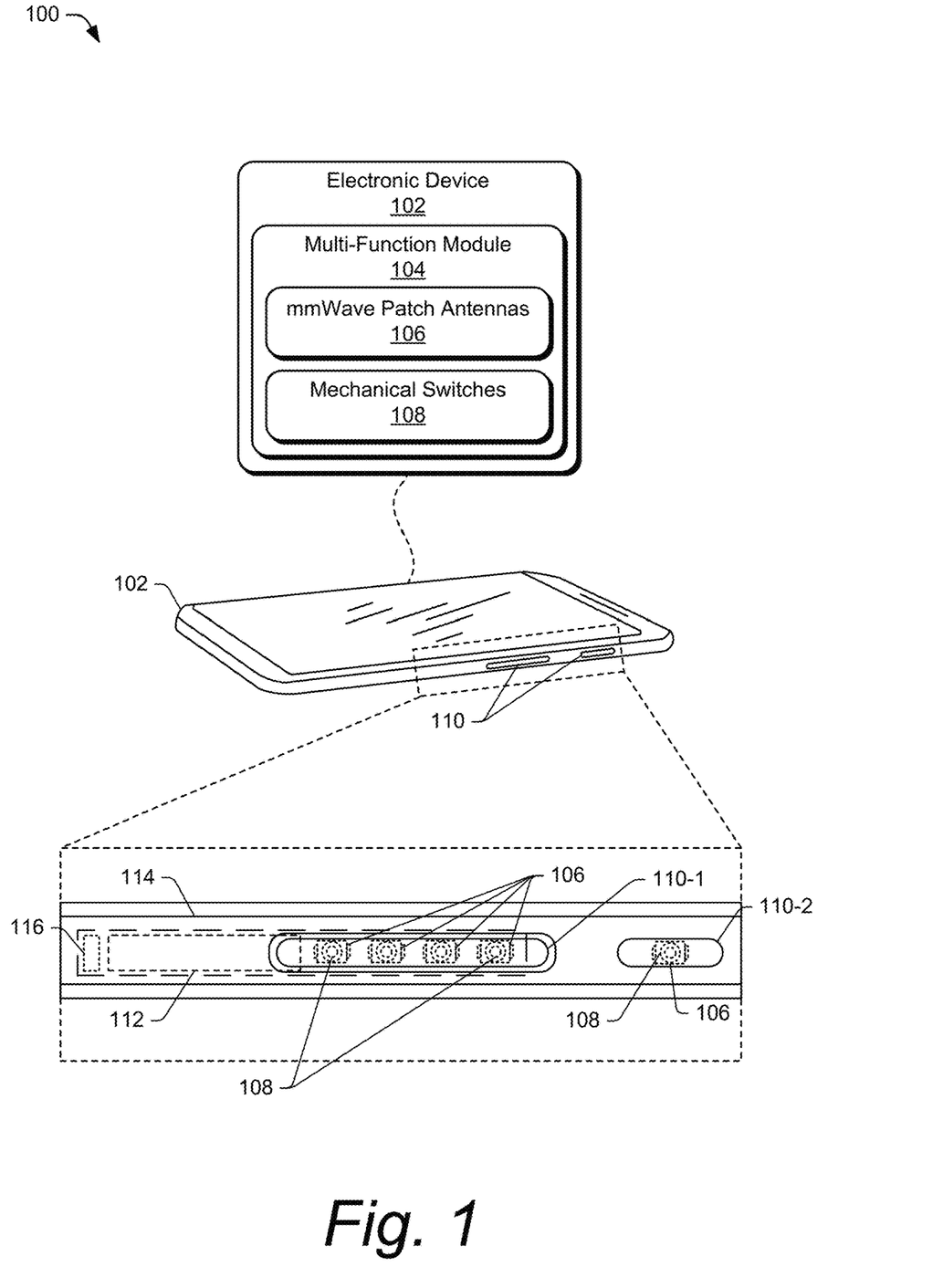
FIG. 1 illustrates an example environment of a multi-function module for mmWave communication and user input using mechanical switches in an electronic device.

FIG. 1 illustrates an example environment 100 of a multi-function module for mmWave communication and user input using mechanical switches in an electronic device. An electronic device 102 includes, among other components, a multi-function module 104 that combines a physical control for an operation (e.g., volume adjustment, power toggle) of the electronic device 102 with mmWave functionality. The multi-function module 104 includes an array of patch antennas (e.g., mmWave patch antennas 106) and switches (e.g., mechanical switches 108). In aspects, the patch antennas and the switches are positioned behind one or more hardware buttons 110 (e.g., a plastic key for pressing on the mechanical switch 108), including a volume button 110-1, a power button 110-2, an application-initiation button (e.g., for a virtual assistant), and so on. The hardware button 110 is a non-metal, non-conductive material that is transparent to mmWave radiation. As is further described below, the mechanical switch(es) 108 and the mmWave patch antennas 106 share a physical volume generally allocated for hardware associated with the hardware button 110, which may utilize a single cutout in the frame of the electronic device 102. The mechanical switches are used as the radiating element(s) of the patch antennas 106. Essentially, the mechanical switches 108 can replace patch antennas used in conventional devices for mmWave communication.

The mmWave patch antennas 106 enable communication (e.g., transmission and reception) of radio frequency (RF) signals in the mmWave frequency band, which is between approximately 24 GHz and approximately 300 GHz. Some wireless-communication systems, such as fifth generation (5G) systems and next generation systems for wireless network technology, may implement mmWave antennas due to their functional properties such as ultra-wideband and high transmission rate. Millimeter waves have short wavelengths that range from approximately ten millimeters to approximately one millimeter. Because of the short wavelengths, millimeter waves travel by line-of-sight and can be blocked by an object (e.g., a building, a tree, a person's finger or hand, a person's body) interfering with a path of the millimeter waves. For this reason, the mmWave patch antenna 106 may be positioned behind (or under) a non-conductive component, including the hardware button 110.

The mechanical switches 108 may include any suitable mechanical switch that can control or trigger a function of the electronic device 102 based on a physical force pressing on the mechanical switch 108. The mechanical switch 108 may be used as the mmWave patch antenna 106 when, for example, the mechanical switch 108 is open. When the physical force causes the mechanical switch 108 to close, the mechanical switch 108 may cease to operate as the mmWave patch antenna 106 and instead trigger an operation by the electronic device 102.

In implementations, one or more integrated circuit (IC) components 112 for RF functionality may be positioned proximate to the mechanical switches 108 within an enclosure 114 (e.g., frame, housing) of the electronic device 102 so as to not be directly behind the hardware button 110. The IC components 112 may include a radio frequency integrated circuit (RFIC), a power management integrated circuit (PMIC), and so on. Additionally, a connector 116 (e.g., a flexible-cable connector) may be positioned proximate to the IC components 112. The connector 116 may be configured to electrically connect the multi-function module 104 to one or more components on a main logic board of the electronic device 102. In another example, the IC components 112 may be positioned on the main logic board and the connector 116 may be configured to electrically connect the multi-function module 104 to the main logic board or to one or more of the IC components 112.

Because the mechanical switches 108 can be used as the radiating elements for the mmWave patch antennas 106, the multi-function module 104 may be implemented with existing enclosures of electronic devices 102 without redesigning or resizing the cutout for the hardware button 110, which may significantly reduce manufacturing costs associated with implementing the multi-function module 104.

Figure 2A:
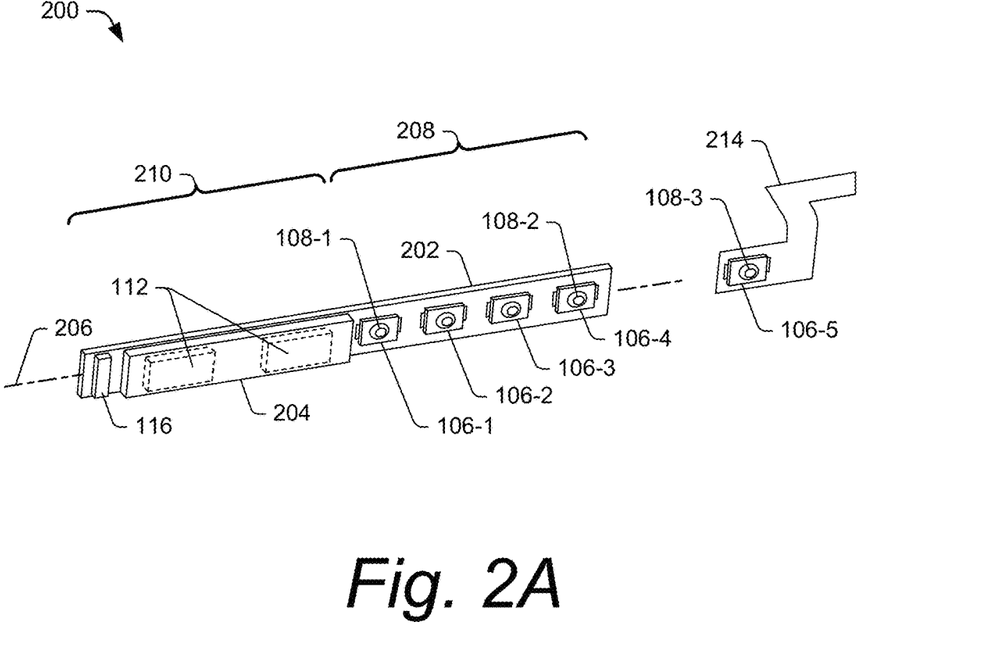
FIGS. 2A and 2B illustrate front perspective views of the multi-function module from FIG. 1 in more detail.
Figure 2B:
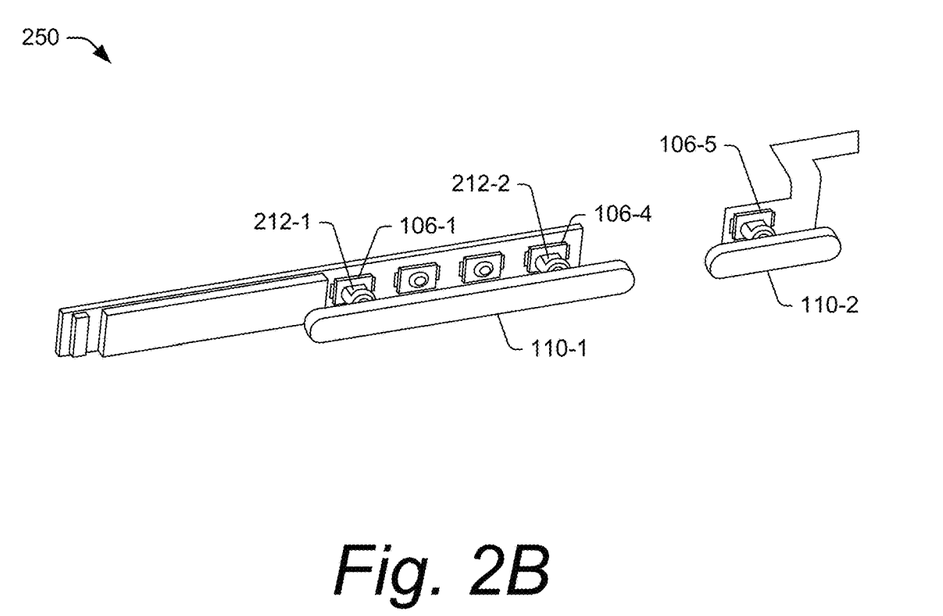

FIGS. 2A and 2B illustrate front perspective views 200 and 250, respectively, of the multi-function module 104 from FIG. 1 in more detail. FIG. 2A illustrates the multi-function module 104 without accompanying hardware buttons. FIG. 2B illustrates the multi-function module 104 with accompanying hardware buttons, including the volume button 110-1 and the power button 110-2, which engage the mechanical switches 108.

The multi-function module 104 includes an antenna substrate 202 (e.g., printed circuit board (PCB)) used to mount the mmWave patch antennas 106 and the mechanical switches 108. In an example, the mmWave patch antennas 106 and the mechanical switches 108 may be mounted directly to the antenna substrate 202. The IC components 112, which may include an RFIC and a PMIC, may also be mounted to the antenna substrate 202. An RF shield 204 may be positioned on the antenna substrate 202 to shield the IC components 112. The antenna substrate 202 may be elongated along a longitudinal axis 206 and at least partially aligned with an elongated hardware button on the electronic device 102, including a volume key on a smartphone, as shown in FIG. 2B. When the antenna substrate 202 is installed into the electronic device 102, the antenna substrate 202 may be positioned along an edge (e.g., a side that is substantially orthogonal to a plane defined by a display) of the electronic device 102. The edge may be substantially parallel to the longitudinal axis 206 or, in some cases, substantially orthogonal to the longitudinal axis 206.

In aspects, the antenna substrate 202 includes a first portion 208 and a second portion 210, which is adjacent to the first portion 208 along the longitudinal axis 206. The plurality of patch antennas 106 may be mounted to the first portion 208 of the antenna substrate 202, whereas the IC components 112 and the RF shield 204 may be mounted to the second portion 210 of the antenna substrate 202. The connector 116 may also be mounted to the second portion 210 of the antenna substrate 202. The connector 116 may be positioned on an opposing side of the RF shield 204 from the mmWave patch antennas 106. Alternatively, the connector 116 may be positioned between the RF shield 204 and the mmWave patch antennas 106. The second portion 210 of the antenna substrate 202 (including the IC components 112, the RF shield 204, and the connector 116) extends beyond the mmWave patch antennas 106 in the direction of the longitudinal axis 206 of the antenna substrate 202. As illustrated in FIG. 2B, the first portion 208 may be aligned with the volume button 110-1. Returning to FIG. 1, the second portion 210 may be positioned, at least partially, behind a wall of the enclosure 114 of the electronic device 102. In some aspects, the second portion 210 is positioned substantially behind the wall of enclosure 114, including, for example, over 80% of the surface area.

The array of patch antennas and mechanical switches 108 may include any suitable configuration and is not limited to the illustrated examples. In the example shown in FIG. 2B, the array includes a 1×4 array of mmWave patch antennas 106 distributed along a longitudinal length of the volume button 110-1. In this example arrangement, the outermost patch antennas (e.g., patch antennas 106-1 and 106-4), positioned behind the volume button 110-1, may be mechanical switches (e.g., mechanical switch 108-1 and mechanical switch 108-2) associated with volume control. For example, the mechanical switch 108-1 may be used as the radiating element for the mmWave patch antenna 106-1 and also operate to initiate a volume-down command. The mechanical switch 108-1 may be operable to initiate the volume-down command based on a mechanical force (e.g., compression force) applied to a portion of a button assembly (e.g., the volume button 110-1 and an interconnecting post 212-1), which transfers the mechanical force to the mechanical switch 108-1 to close the mechanical switch 108-1. Similarly, the mechanical switch 108-2 may be used as the radiating element for the mmWave patch antenna 106-4 and also operate to initiate a volume-up command. The mechanical switch 108-2 may be operable to initiate the volume-up command based on a mechanical force applied to another portion of the button assembly (e.g., the volume button 110-1 and an interconnecting post 212-2), which transfers the mechanical force to the mechanical switch 108-2 to close the mechanical switch 108-2. The remaining patch antennas in the array (e.g., mmWave patch antennas 106-2 and 106-3) may be radiating elements that are dummy switches or that are not mechanical switches at all.

Alternative implementations may include the outermost mechanical switches 108 (for volume control) implemented as the radiating elements of the patch antennas 106 with zero, one, or more patch antennas positioned between them. Another implementation may include mechanical switches in the middle of the array, with patch antennas, which are not mechanical switches, positioned in the outer positions of the array. Yet another implementation, which may be combined with the above implementations, may include the power button 110-2 having a mechanical switch 108 used as the radiating element for a mmWave patch antenna 106. For example, the antenna substrate 202 may extend (not shown) to include mechanical switch 108-3, which is operable as a power switch to toggle power to the electronic device 102 or to a display of the electronic device 102. The mechanical switch 108-3 also may be used as a radiating element for a mmWave patch antenna 106-5 to provide additional support for the mmWave functionality of the electronic device 102. In other implementations, and as illustrated, the mechanical switch 108-3 may be mounted on a different substrate (e.g., a flexible printed circuit board 214) and included on a separate mmWave module of the electronic device 102.

Multiple patch antennas 106 are implemented in the multi-function module 104 to enable the electronic device 102 to switch between the patch antennas 106 (e.g., the patch antennas 106-1, 106-2, 106-3, 106-4, and 106-5) for mmWave communication when a user's finger is positioned over one or more of the patch antennas, including when the user presses the volume button 110-1 to adjust the volume or presses the power button 110-2 to toggle the power. Alternatively, the electronic device 102 can switch to a different mmWave module implemented at a different location on the electronic device 102 when one or more of the patch antennas 106 are occluded by the user's finger or other object. Although the examples described herein show four or five patch antennas 106 integrated with two or three mechanical switches 108, any suitable number of patch antennas 106 (e.g., two, three, four, five, six) can be integrated with any suitable number of mechanical switches 108 (e.g., two, three, four, five, six). For example, the array may include mmWave patch antennas that are each mechanical switches.

Additional alternative implementations may include the first portion 208 and the second portion 210 of the antenna substrate 202 located on opposite sides of the antenna substrate 202, rather than adjacent to one another on the same side of the antenna substrate 202. However, having the first and second portions 208 and 210, respectively, located on the same side of the antenna substrate 202 allows additional space behind the antenna substrate 202 for other components, including the battery. Such additional physical space may, in some cases, enable a larger battery with increased battery capacity to be used in the electronic device 102.

The antenna substrate 202 may be formed, for example, from glass-reinforced epoxy material (e.g., FR4), a liquid-crystal polymer (LCP), a polyimide material, or other suitable substrate material. In some instances, the antenna substrate 202 may include a single layer of electrically conductive traces and be a single-layer board. In other instances, the antenna substrate 202 may be a multi-layer board that includes multiple layers of electrically conductive traces that are separated by layers of a dielectric material.

In some aspects, the patch antennas 106 may have a width that is equal to or less than a width of a slot defined by the enclosure 114 for the corresponding hardware button 110. The width of the patch antennas 106 may be dependent on, or limited by, the width of the slot to reduce signal interference caused by the enclosure 114, which may be a metal material.

Figure 3:
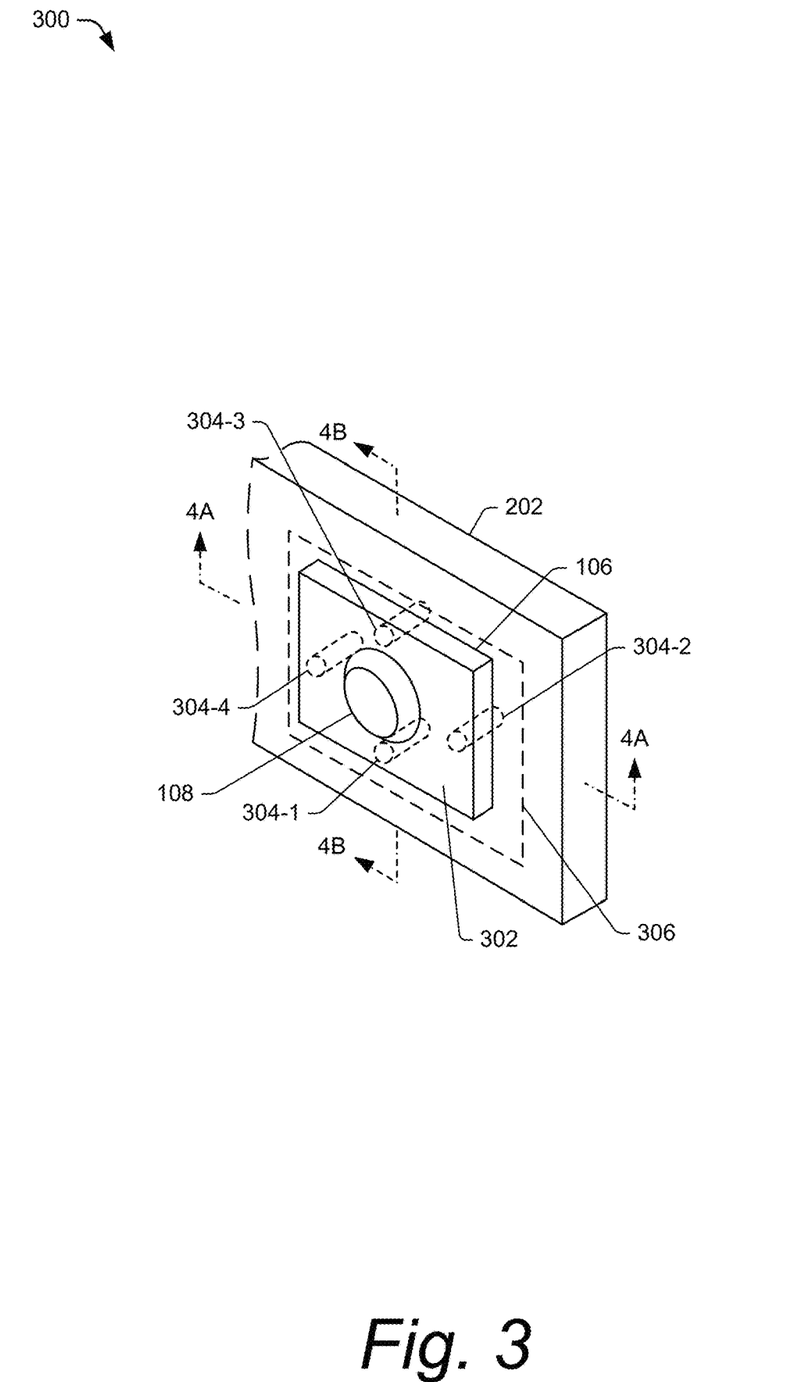
FIG. 3 illustrates an enlarged view of an example implementation of a mmWave patch antenna combined with a mechanical switch.

FIG. 3 illustrates an enlarged view 300 of an example implementation of a mmWave patch antenna 106 combined with a mechanical switch 108. The mmWave patch antenna 106 is configured for dual-band operation (e.g., for high-band frequencies and low-band frequencies). For dual-band configuration, the mmWave patch antenna 106 includes a radiating element 302 electrically connected to multiple feedlines 304 (e.g., feedlines 304-1, 304-2, 304-3, and 304-4) to detect mmWave signals. The feedlines 304 may include vertical and/or horizontal antenna polarizations. In an example, the feedline 304-1 may have a vertical antenna polarization ($V_{LB}$) for the low-band frequencies, and the feedline 304-2 may have a horizontal antenna polarization ($H_{LB}$) for the low-band frequencies. In addition, the feedline 304-3 may have a vertical antenna polarization ($V_{HB}$) for the high-band frequencies, and the feedline 304-4 may have a horizontal antenna polarization ($H_{HB}$) for the high-band frequencies. In aspects, each vertically-polarized feedline is approximately 90° out of phase with each horizontally-polarized feedline. Example low-band frequencies for mmWave communication may be in a range of approximately 24 gigahertz (GHz) to approximately 29 GHz. Example high-band frequencies for mmWave communication may be in a range of approximately 36 GHz to approximately 40 GHz.

The mmWave patch antenna 106 also includes a stacked patch 306 (e.g., parasitic patch), which may be included in an inner layer of the antenna substrate 202. The stacked patch 306 may enable a dual-band response to the antenna. The stacked patch may or may not be connected to the feedlines 304.

Figure 4A:
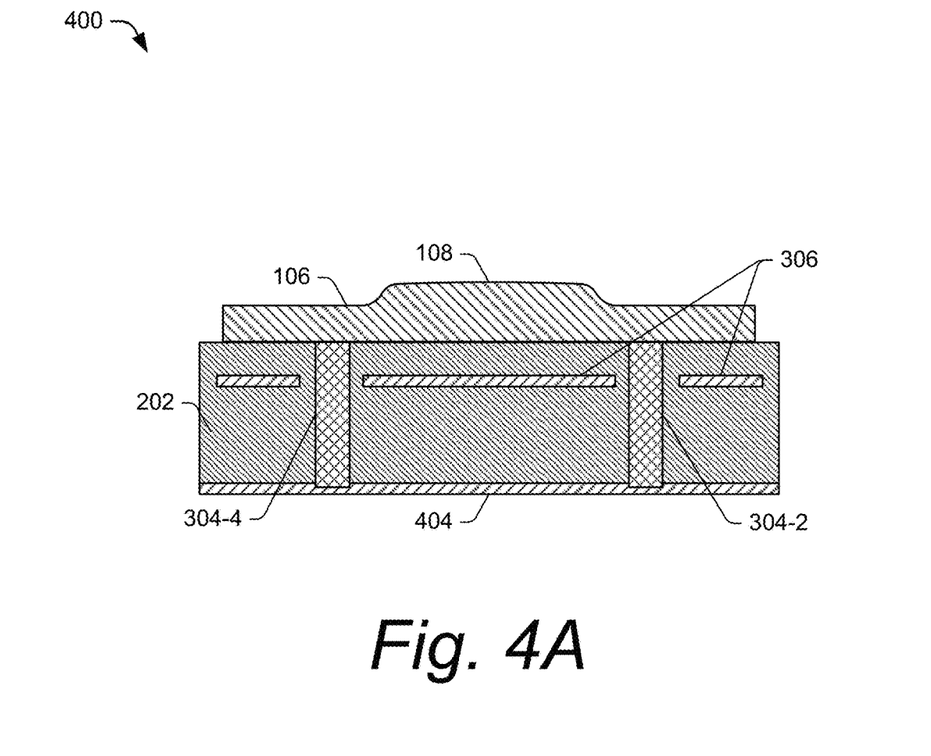
FIG. 4A illustrates a cross-sectional view of the mmWave patch antenna combined with the mechanical switch from FIG. 3, taken along line 4A-4A.
Figure 4B:
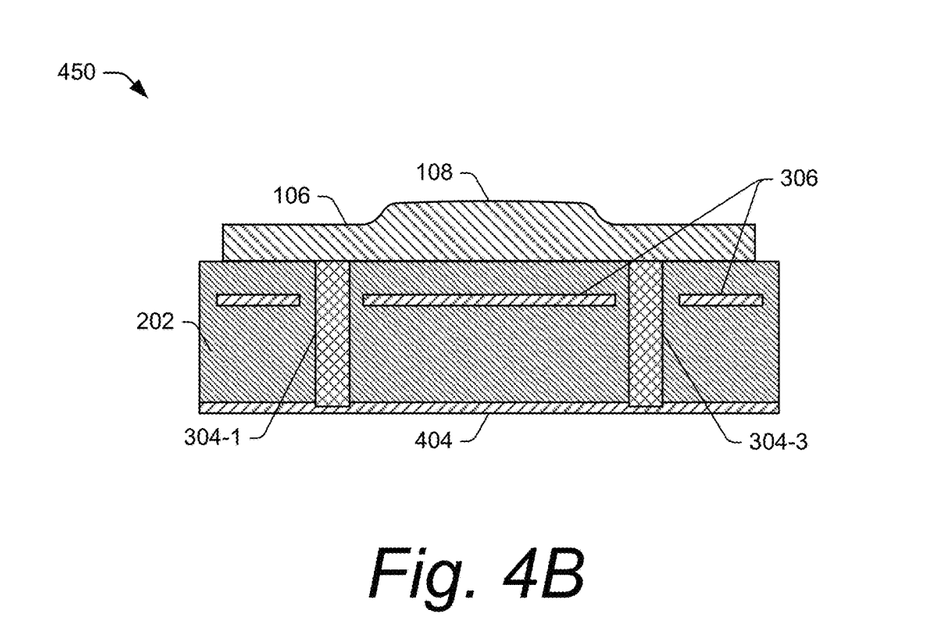
FIG. 4B illustrates a cross-sectional view of the mmWave patch antenna combined with the mechanical switch from FIG. 3, taken along line 4B-4B.

FIG. 4A illustrates a cross-sectional view 400 of the patch antenna combined with the mechanical switch from FIG. 3, taken along line 4A-4A. FIG. 4B illustrates a cross-sectional view 450 of the patch antenna combined with the mechanical switch from FIG. 3, taken along line 4B-4B.

In FIG. 4A, the cross-sectional view 400 shows the mmWave patch antenna 106 with a pair of horizontally-polarized feedlines (e.g., the feedline 304-4 ($H_{HB}$) and the feedline 304-2 ($H_{LB}$)). In aspects, the two horizontally-polarized feedlines are positioned on opposite sides of the mechanical switch 108 and connect the radiating element 302 of the mmWave patch antenna 106 to a ground plane 402 on the backside 404 of the mmWave patch antenna 106 (e.g., on a back surface of the antenna substrate 202 that is opposite a front surface of the antenna substrate 202 on which the radiating element 302 is mounted. In addition, the stacked patch 306 is illustrated on an inner layer of the antenna substrate 202.

In FIG. 4B, the cross-sectional view 450 shows the mmWave patch antenna 106 with a pair of vertically-polarized feedlines (e.g., the feedline 304-1 ($V_{LB}$) and the feedline 304-3 ($V_{HB}$)). In aspects, the two vertically-polarized feedlines are positioned on opposite sides of the mechanical switch 108.

The cross-sectional views 400 and 450 each illustrate the stacked patch 306 as not being connected to the feedlines 304. In some implementations, however, the stacked patch 306 may be connected to one or more of the feedlines 304.

Figure 5:
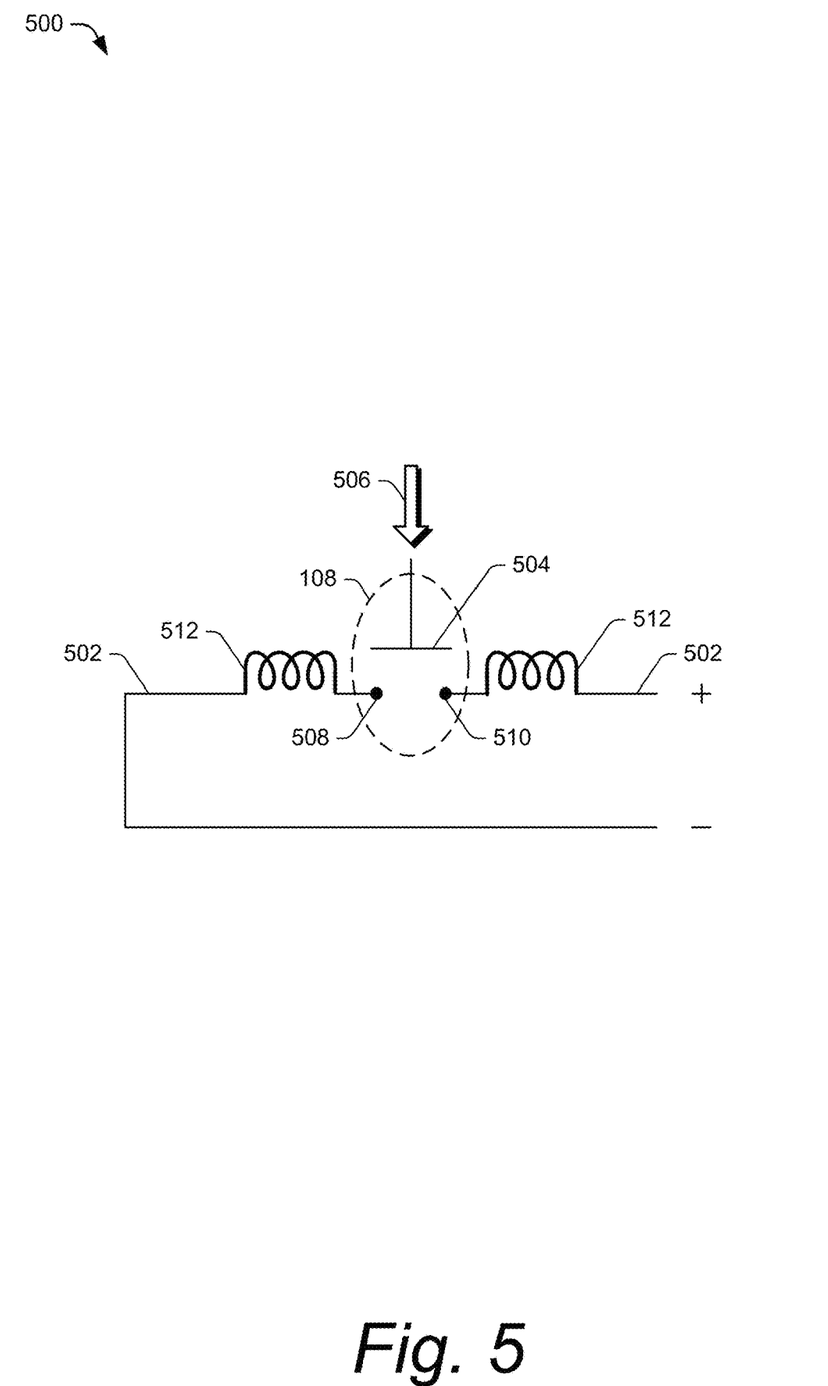
FIG. 5 illustrates an example circuit diagram for the mechanical switch from FIG. 1.

FIG. 5 illustrates an example circuit diagram 500 for the mechanical switch 108 from FIG. 1. To detect a key press, the mechanical switch 108 includes digital switch lines 502 (positive and negative) connected to a switch 504. When the hardware button 110 (from FIG. 1) applies a compression force 506 to the switch 504, the switch 504 completes the circuit by connecting endpoint 508 to endpoint 510 to connect the digital switch lines 502 together.

To reduce interference from the antenna function of the mmWave patch antenna 106, the digital switch lines 502 are decoupled from the RF lines (e.g., the feedlines 304) of the mmWave patch antenna 106. For example, each digital switch line 502 of the mechanical switch 108 includes an RF choke 512 in series, resulting in two RF chokes 512 on opposing sides of the switch 504. The RF chokes 512 may include a positive choke and a negative choke. In aspects, the RF chokes 512 block the RF signals from entering the digital domain of the digital switch lines 502. Corresponding RF chokes 512 can be implemented for each of the mechanical switches 108 of the multi-function module 104, including the mechanical switches 108 corresponding to a volume-up button, a volume-down button, the power button, and/or any other suitable button on the electronic device 102. In alternative implementations, a key network or a pie network may be implemented to block the RF signals of the mmWave patch antenna 106 when the mechanical switch 108 is closed. Decoupling the digital switch lines 502 from the RF lines (e.g., the feedlines 304) in this way enables the antenna and button function to operate simultaneously.

Figure 6:
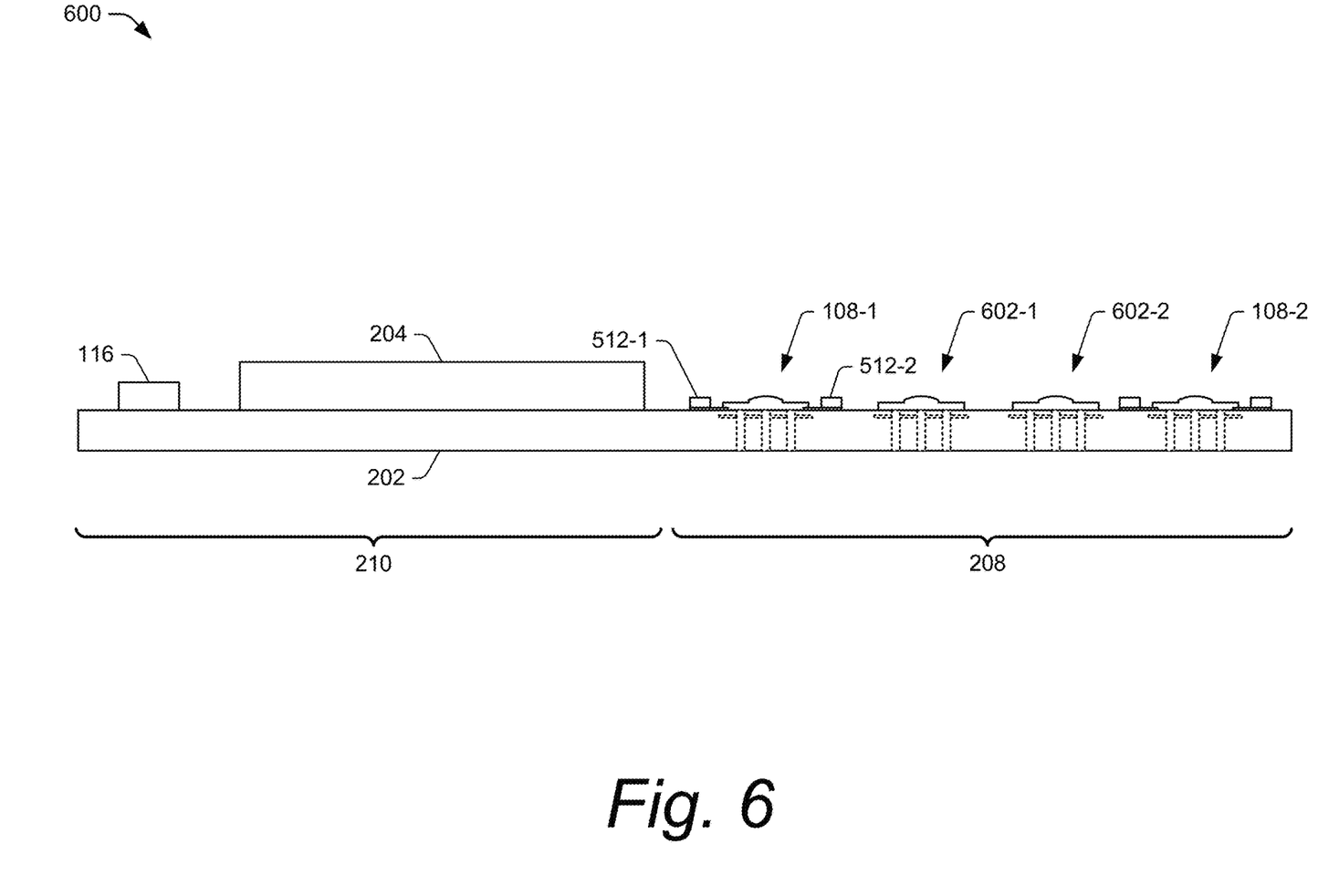
FIG. 6 illustrates a side elevational view of the multi-function module from FIG. 2.

FIG. 6 illustrates a side elevational view 600 of the multi-function module 104 from FIG. 2. In the illustrated example, the connector 116 and the RF shield 204, which houses the IC components 112 (not shown), are mounted onto the second portion 210 of the antenna substrate 202. The first portion 208 of the antenna substrate 202 includes two mechanical switches (e.g., mechanical switches 108-1 and 108-2) separated by two dummy switches, 602-1 and 602-2. Each of the mechanical switches 108-1 and 108-2 and dummy switches 602-1 and 602-2 may be operable as one of the mmWave patch antennas 106. In aspects, the mechanical switch 108-1 also corresponds to a volume-down button and is operable to initiate a volume-down input. The mechanical switch 108-2 also corresponds to a volume-up button and is operable to initiate a volume-up input. The dummy switches 602-1 and 602-2 are operable as mmWave patch antennas but, in this example, are not operable as switches for triggering a function of the electronic device.

Each of the mechanical switches 108-1 and 108-2 is connected to one or more RF chokes 512 to decouple the digital lines of the switch from the antenna function. For example, RF chokes 512-1 and 512-2 are positioned on opposite sides of the mechanical switch 108-1 and may operate as discussed above with respect to FIG. 5.

Figure 7:
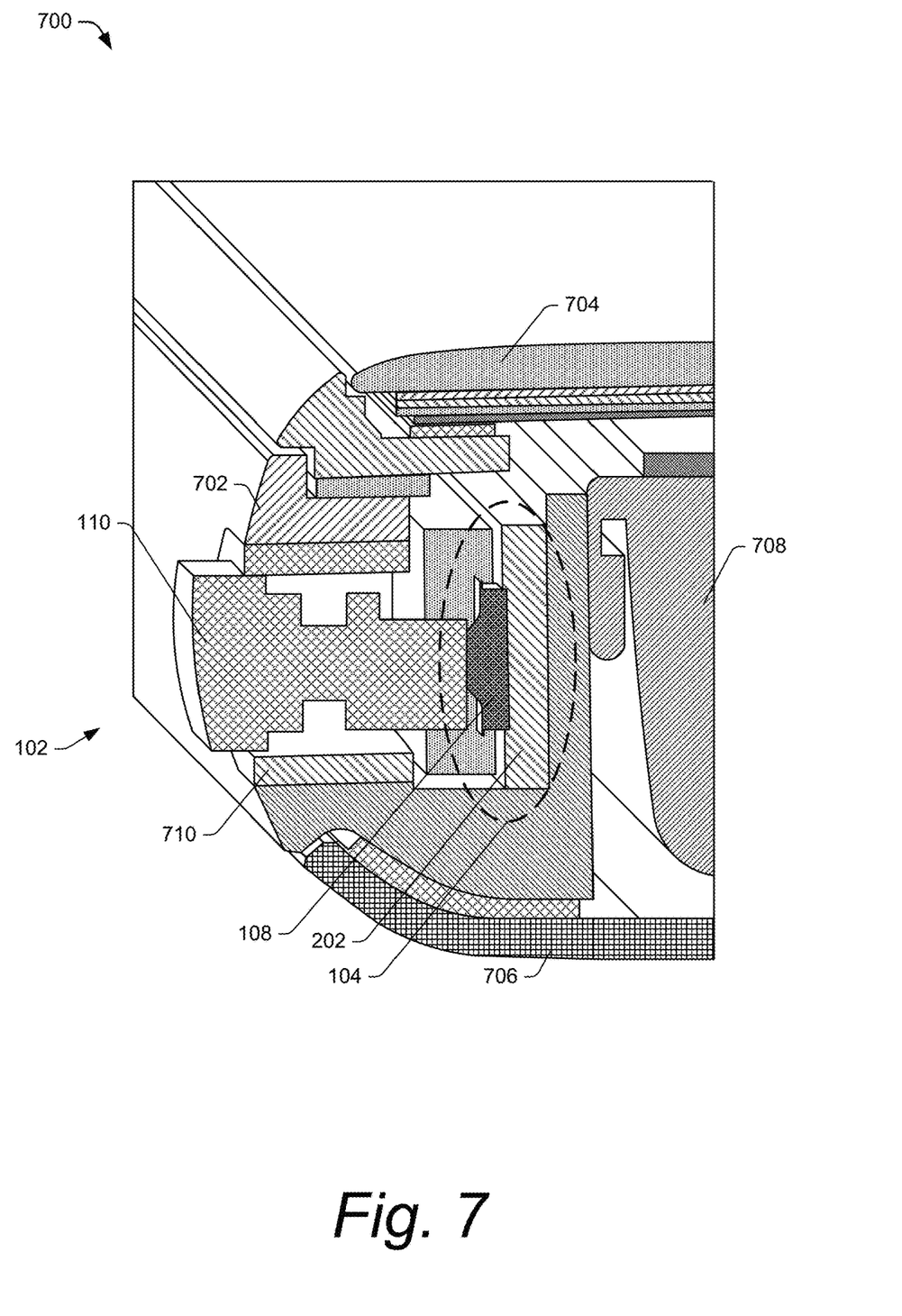
FIG. 7 illustrates a cross-sectional view of a portion of the electronic device 102, including the multi-function module.

FIG. 7 illustrates a cross-sectional view 700 of a portion of the electronic device 102, including the multi-function module 104. The electronic device 102 is illustrated as having a metal enclosure (e.g., the enclosure 114) forming a frame 702 of the electronic device 102. The electronic device 102 also includes a display 704, a back glass 706, the hardware button 110 (e.g., volume button 110-1, power button 110-2), and a battery 708.

The frame 702 is a support structure that forms a perimeter of the electronic device 102 around the display 704. The frame 702 includes an exterior wall defining an elongated hole in which the hardware button 110 is positioned. The multi-function module 104 may be positioned within the frame 702 to enable the mechanical switch 108 to face outward and interface with a portion of the hardware button 110. In aspects, RF radiation passes through the non-conductive hardware button 110, either traveling toward the mechanical switch 108 (operating as the mmWave patch antenna 106) or radiating away from the mechanical switch 108. In some implementations, the electronic device 102 includes a plastic co-mold 710 positioned around the hardware button 110 and between the hardware button 110 and the frame 702. This plastic co-mold 710 can be used to create extra separation from the hardware button 110, which enlarges a "window" in the enclosure for the mmWave radiation to pass through. The radiation may pass through the hardware button 110 and the plastic co-mold 710 in a cone-shape that tapers toward the mechanical switch 108, acting as the mmWave patch antenna 106.

Many devices have the volume controls located on an edge of the device (e.g., on a lateral side of the display and/or on a vertical side of the electronic device 102 when orientated in a portrait mode). When the electronic device 102 is used in landscape orientation, the volume controls may be facing upward (e.g., toward the sky). If a mmWave base station is located above the electronic device 102 (e.g., on a lamp post) and a user of the electronic device 102 is standing underneath the base station and holding the electronic device 102 in the landscape orientation effective to enable the mmWave patch antennas 106 to have direct line-of-sight with the base station, then interference with the mmWave signals may be reduced and the performance of mmWave communication may be enhanced. Accordingly, combining the mmWave functionality with the volume controls may improve landscape mmWave performance.

Figure 8:
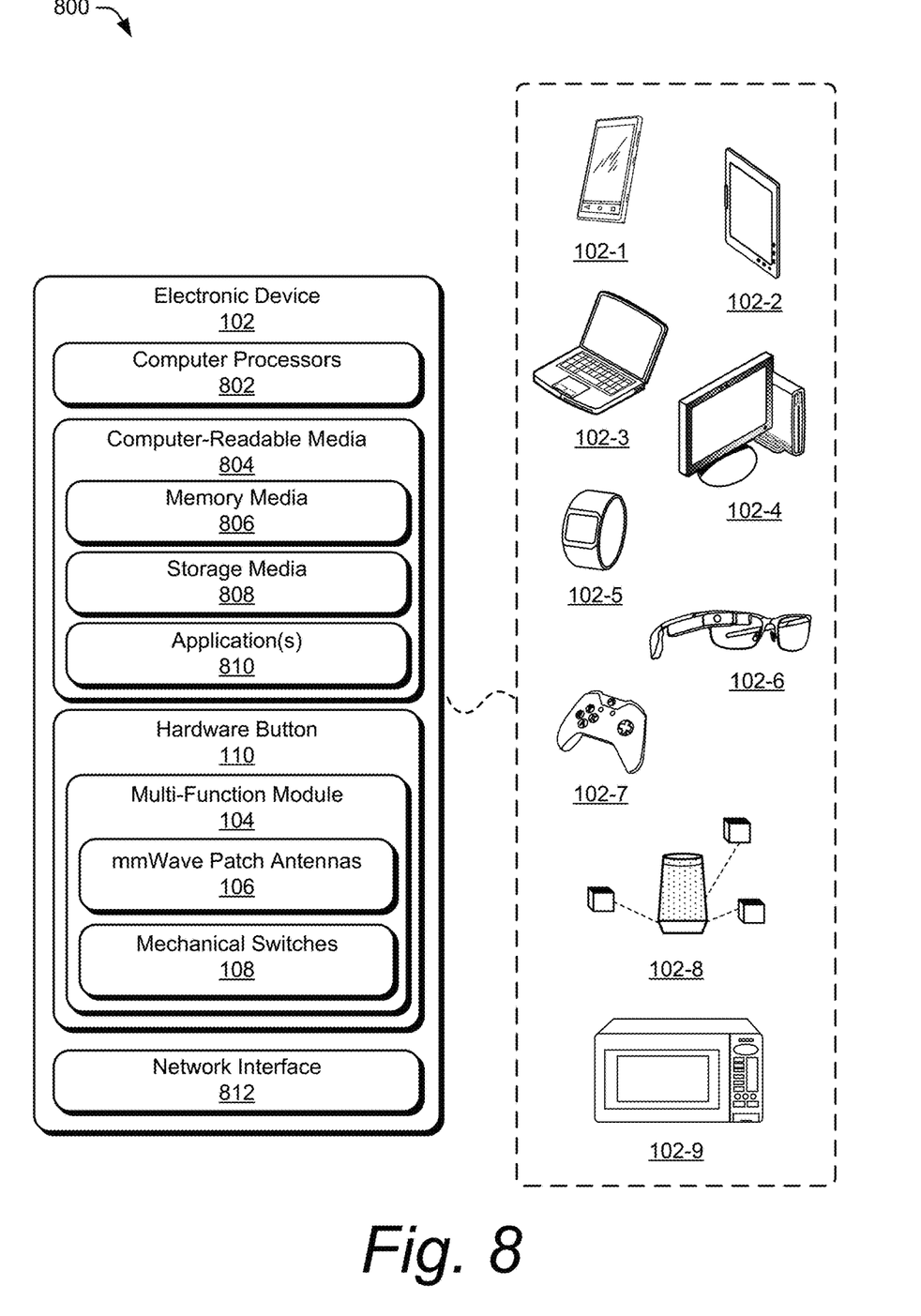
FIG. 8 illustrates an example implementation of the electronic device from FIG. 1 in greater detail, in accordance with one or more aspects.

FIG. 8 illustrates an example implementation 800 of the electronic device 102 from FIG. 1 in greater detail in accordance with one or more aspects. The electronic device 102 is illustrated with various non-limiting example devices: a smartphone 102-1, a tablet 102-2, a laptop 102-3, a desktop 102-4, a wearable computing device 102-5 (e.g., smartwatch), computing spectacles 102-6 (e.g., smart glasses), a gaming system 102-7, a home-automation and control system 102-8, and an appliance 102-9 (e.g., a microwave).

The electronic device 102 includes computer processor(s) 802 and computer-readable media 804, which includes non-transitory memory media 806 and non-transitory storage media 808. Applications and/or an operating system (not shown) implemented as computer-readable instructions stored on the computer-readable media 804 can be executed by the computer processor(s) 802 to provide some or all of the functionalities described herein, including operation of the mmWave patch antennas 106 and/or the mechanical switches 108. For example, the computer-readable media 804 can include application(s) 810, which can utilize the multi-function module 104 for both (i) user input (e.g., adjust the volume, power off the display) using the hardware button 110 and (ii) mmWave communication with a base station. The electronic device 102 may be implemented with any number of mmWave modules, including the multi-function module 104, for mmWave communication with the base station, such as two mmWave modules, three mmWave modules, four mmWave modules, five mmWave modules, and so forth. Generally, implementing multiple mmWave modules in a handheld electronic device provides improved performance for mmWave communication compared to using a single mmWave module in the handheld electronic device. However, manufacturing costs may increase with an increased number of mmWave modules.

The computer processors 802 may include an SoC, one or more of the IC components 112 (e.g., an RFIC, a PMIC), a processor with embedded processor instructions or configured to access processor instructions stored in memory, hardware with embedded firmware, a printed circuit board with various hardware components, or any combination thereof.

The electronic device 102 may also include a network interface(s) 812 for communicating data over wired, wireless, or optical networks. By way of example and not limitation, the network interface 812 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Some examples are described below:

Example 1: A multi-function module for mmWave communication and user input using mechanical switches, the multi-function module comprising: an elongated antenna substrate; a plurality of mechanical switches mounted to the elongated antenna substrate and distributed along a longitudinal length of the elongated antenna substrate, at least one mechanical switch of the plurality of mechanical switches being implemented as a radiating element for a mmWave patch antenna; and one or more integrated circuit components mounted to the elongated antenna substrate and configured to use the at least one mechanical switch as the radiating element for the mmWave patch antenna to provide the mmWave communication.

Example 2: The multi-function module as recited in example 1, wherein the plurality of mechanical switches are positioned behind one or more non-conductive hardware buttons of an electronic device. That is, the plurality of mechanical switches may be configured to be positioned behind one or more non-conductive hardware buttons of an electronic device.

Example 3: The multi-function module as recited in example 2, wherein the at least one mechanical switch is positioned to interface with a post of a hardware button of the one or more non-conductive hardware buttons when a compression force is applied to the hardware button. That is, the at least one mechanical switch may be configured to be positioned so as to interface with a post of a hardware button of the one or more non-conductive hardware buttons when a compression force is applied to the hardware button Example 4: The multi-function module as recited in any preceding example wherein the one or more integrated circuit components and the plurality of mechanical switches are mounted to a same side of the elongated antenna substrate.

Example 5: The multi-function module as recited in any preceding example, wherein: the elongated antenna substrate comprises a first portion and a second portion adjacent to the first portion; the first and second portions are located on a same side of the elongated antenna substrate; the plurality of mechanical switches are mounted to the first portion; and the one or more integrated circuit components are mounted to the second portion.

Example 6: The multi-function module as recited in any preceding example, wherein one or more of the plurality of mechanical switches are operable to adjust a volume of an electronic device.

Example 7: The multi-function module as recited in any preceding example, wherein one of the plurality of mechanical switches is operable to toggle power to an electronic device or to a display of the electronic device.

Example 8: The multi-function module as recited in any preceding example, wherein the at least one mechanical switch is connected to: one or more digital switch lines for detecting a key press; one or more radio frequency feedlines for detecting mmWave signals; and a radio frequency choke in series with each of the one or more digital switch lines to decouple the one or more digital switch lines from the one or more radio frequency feedlines. Of course, it will be appreciated that a radio frequency choke may not be required in every example.

Example 9: The multi-function module as recited in example 8, wherein the radio frequency choke is operable to decouple the one or more digital switch lines from the one or more radio frequency feedlines when the at least one mechanical switch is closed.

Example 10: The multi-function module as recited in any preceding example, wherein the at least one mechanical switch is connected to: a first vertically-polarized feedline and a first horizontally-polarized feedline usable for low-band frequency transmission and reception; and a second vertically-polarized feedline and a second horizontally-polarized feedline usable for high-band frequency transmission and reception. Of course, it will be appreciated that in some examples, only one horizontally-polarized feedline, and/or one vertically-polarized feedline may be used for either low-band or high-band frequency transmission and reception.

Example 11: The multi-function module as recited in any preceding example, wherein: the at least one mechanical switch includes first and second mechanical switches implemented as radiating elements for first and second mmWave patch antennas, respectively; and the multi-function module further comprises at least a third mmWave patch antenna positioned between the first and second mechanical switches.

Example 12: The multi-function module as recited in example 11, wherein: the first mechanical switch is operable to increase a volume of an electronic device; and the second mechanical switch is operable to decrease the volume of the electronic device.

Example 13: The multi-function module as recited in any preceding example, further comprising a connector positioned on a same side of the elongated antenna substrate as the plurality of mechanical switches, the connector configured to electrically connect the multi-function module to one or more components on a main logic board.

Example 14: The multi-function module as recited in any preceding example, wherein the one or more integrated circuit components comprise a radio frequency integrated circuit and a power management integrated circuit.

Example 15: An electronic device comprising: an enclosure having an exterior wall defining an elongated hole; a non-conductive hardware button positioned within the elongated hole in the enclosure; and the multi-function module of any preceding example, the multi-function module aligned with the non-conductive hardware button.

Conclusion

Although aspects of the multi-function module for mmWave communication and user input using mechanical switches in an electronic device have been described in language specific to features and/or methods, the subject of the appended claims is not necessarily limited to the specific features or methods described. Rather, the specific features and methods are disclosed as example implementations of the multi-function module for mmWave communication and user input using mechanical switches in an electronic device, and other equivalent features and methods are intended to be within the scope of the appended claims. Further, various different aspects are described, and it is to be appreciated that each described aspect can be implemented independently or in connection with one or more other described aspects.

What is claimed is:

1. A multi-function module for mmWave communication and user input using mechanical switches, the multi-function module comprising:
   an elongated antenna substrate;
   a plurality of mechanical switches mounted to the elongated antenna substrate and distributed along a longitudinal length of the elongated antenna substrate, at least one mechanical switch of the plurality of mechanical switches being implemented as a radiating element for a mmWave patch antenna, the at least one mechanical switch connected to:
      one or more digital switch lines for detecting a key press;
      one or more radio frequency feedlines for detecting mmWave signals; and
      a radio frequency choke in series with at least one digital switch line of the one or more digital switch lines to decouple the at least one digital switch line from at least one radio frequency feedline of the one or more radio frequency feedlines; and
   one or more integrated circuit components mounted to the elongated antenna substrate and configured to use the at least one mechanical switch as the radiating element for the mmWave patch antenna to provide the mmWave communication.

2. The multi-function module as recited in claim 1, wherein the plurality of mechanical switches are configured to be positioned behind one or more non-conductive hardware buttons of an electronic device.

3. The multi-function module as recited in claim 2, wherein the at least one mechanical switch is configured to be positioned to interface with a post of a hardware button of the one or more non-conductive hardware buttons when a compression force is applied to the hardware button.

4. The multi-function module as recited in claim 1 wherein the one or more integrated circuit components and the plurality of mechanical switches are mounted to a same side of the elongated antenna substrate.

5. The multi-function module as recited in claim 1, wherein:
   the elongated antenna substrate comprises a first portion and a second portion adjacent to the first portion;
   the first and second portions are located on a same side of the elongated antenna substrate;
   the plurality of mechanical switches are mounted to the first portion; and
   the one or more integrated circuit components are mounted to the second portion.

6. The multi-function module as recited in claim 1, wherein one or more of the plurality of mechanical switches are operable to adjust a volume of an electronic device.

7. The multi-function module as recited in claim 1, wherein one of the plurality of mechanical switches is operable to toggle power to an electronic device or to a display of the electronic device.

8. The multi-function module as recited in claim 1, wherein the radio frequency choke is operable to decouple the one or more digital switch lines from the one or more radio frequency feedlines when the at least one mechanical switch is closed.

9. The multi-function module as recited in claim 1, wherein the at least one mechanical switch is connected to:
   a first vertically-polarized feedline and a first horizontally-polarized feedline usable for low-band frequency transmission and reception; and
   a second vertically-polarized feedline and a second horizontally-polarized feedline usable for high-band frequency transmission and reception.

10. The multi-function module as recited in claim 1, wherein:
    the at least one mechanical switch includes first and second mechanical switches implemented as radiating elements for first and second mmWave patch antennas, respectively; and
    the multi-function module further comprises at least a third mmWave patch antenna positioned between the first and second mechanical switches.

11. The multi-function module as recited in claim 10, wherein:
    the first mechanical switch is operable to increase a volume of an electronic device; and
    the second mechanical switch is operable to decrease the volume of the electronic device.

12. The multi-function module as recited in claim 1, further comprising a connector positioned on a same side of the elongated antenna substrate as the plurality of mechanical switches, the connector configured to electrically connect the multi-function module to one or more components on a main logic board.

13. The multi-function module as recited in claim 1, wherein the one or more integrated circuit components comprise a radio frequency integrated circuit and a power management integrated circuit.

14. The multi-function module as recited in claim 1, wherein the radio frequency choke includes a positive choke and a negative choke positioned on opposing sides of a switch of the at least one mechanical switch.

15. The multi-function module as recited in claim 14, wherein:
the at least one digital switch line includes positive and negative switch lines; and
the switch of the at least one mechanical switch is configured to connect endpoints together of the positive and negative switch lines to complete a circuit when a compression force is applied to the at least one mechanical switch.

16. An electronic device comprising:
an enclosure having an exterior wall defining an elongated hole;
a non-conductive hardware button positioned within the elongated hole in the enclosure; and
a multi-function module aligned with the non-conductive hardware button, the multi-function module comprising:
an elongated antenna substrate;
a plurality of mechanical switches mounted to the elongated antenna substrate and distributed along a longitudinal length of the elongated antenna substrate, at least one mechanical switch of the plurality of mechanical switches being implemented as a radiating element for a mmWave patch antenna, the at least one mechanical switch connected to a plurality of radio frequency feedlines including:
a least one of a first vertically-polarized feedline or a first horizontally-polarized feedline usable for low-band frequency transmission and reception; and
at least one of a second vertically-polarized feedline or a second horizontally-polarized feedline usable for high-band frequency transmission and reception; and
one or more integrated circuit components mounted to the elongated antenna substrate and configured to use the at least one mechanical switch as the radiating element for the mmWave patch antenna to provide mmWave communication.

17. The electronic device as recited in claim 16, wherein:
the plurality of mechanical switches are configured to be positioned behind one or more non-conductive hardware buttons of an electronic device; and
the at least one mechanical switch is configured to be positioned to interface with a post of a hardware button of the one or more non-conductive hardware buttons when a compression force is applied to the hardware button.

18. The electronic device as recited in claim 16, wherein:
the elongated antenna substrate comprises a first portion and a second portion adjacent to the first portion;
the first and second portions are located on a same side of the elongated antenna substrate;
the plurality of mechanical switches are mounted to the first portion; and
the one or more integrated circuit components are mounted to the second portion.

19. The electronic device as recited in claim 16, wherein the at least one mechanical switch is connected to:
one or more digital switch lines for detecting a key press;
the plurality of radio frequency feedlines for detecting mmWave signals; and
a radio frequency choke in series with each of the one or more digital switch lines to decouple the one or more digital switch lines from the one or more radio frequency feedlines.

20. The electronic device as recited in claim 19, wherein the radio frequency choke is operable to decouple the one or more digital switch lines from the one or more radio frequency feedlines when the at least one mechanical switch is closed.

* * * * *